US008421644B2

(12) United States Patent
Zhang

(10) Patent No.: US 8,421,644 B2
(45) Date of Patent: Apr. 16, 2013

(54) LIGHT-EMITTING DIODE CONTROL SYSTEM AND METHOD

(75) Inventor: Le Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 371 days.

(21) Appl. No.: 12/881,153

(22) Filed: Sep. 13, 2010

(65) Prior Publication Data

US 2011/0309947 A1  Dec. 22, 2011

(30) Foreign Application Priority Data

Jun. 21, 2010 (CN) .......................... 2010 1 0204360

(51) Int. Cl.
*G08B 5/00* (2006.01)

(52) U.S. Cl.
USPC ................. 340/691.3; 340/691.1; 340/815.45

(58) Field of Classification Search ............... 340/691.1, 340/691.2, 691.3, 691.4, 691.5, 691.8, 815.4, 340/815.43, 815.45; 400/61, 70, 74; 236/49.2; 73/866.5; 345/629, 635
See application file for complete search history.

(56) References Cited

U.S. PATENT DOCUMENTS

| | | | |
|---|---|---|---|
| 6,522,689 B1 * | 2/2003 | Heinrich | 375/224 |
| 6,612,759 B2 * | 9/2003 | Fukano et al. | 400/74 |
| 7,030,892 B1 * | 4/2006 | Gyde et al. | 345/635 |
| 7,301,447 B2 * | 11/2007 | Patel | 340/475 |
| 7,538,781 B2 * | 5/2009 | Gyde et al. | 345/629 |
| 8,059,006 B2 * | 11/2011 | Schweitzer et al. | 340/635 |
| 8,313,038 B2 * | 11/2012 | Therrien et al. | 236/49.2 |
| 2008/0010519 A1 * | 1/2008 | Beyer | 714/21 |
| 2011/0083521 A1 * | 4/2011 | Hollander et al. | 73/866.5 |

* cited by examiner

*Primary Examiner* — Van T. Trieu
(74) *Attorney, Agent, or Firm* — Altis Law Group, Inc.

(57) ABSTRACT

A light-emitting diode (LED) control system and method sets a number of virtual LEDs according to a number of error events of a computing device. The system and method further assigns a priority level to each error event and a unique indication status of the error event. If more than one error event occurs to the computing device, each error event is indicated by a virtual LED by a unique indication status, however, only the error event having the highest priority level is synchronously indicated by a virtual LED and the physical LED.

19 Claims, 5 Drawing Sheets

LIGHT-EMITTING DIODE CONTROL SYSTEM AND METHOD

BACKGROUND

1. Technical Field

Embodiments of the present disclosure relates to electronic elements control systems and methods, and more particularly, to a light-emitting diode control system and method.

2. Description of Related Art

Light-emitting diodes (LEDs) are often used for indicating work statuses of electronic components of electronic devices. For example, a computer may use one or more LEDs as indicators of the computer's components, such as fans, net cards, batteries, and so on. When an error occurs to a component, a corresponding LED is turned on and emits a preset colored light, to notify users of the error. However, an electronic device often has multiple components, and all of the components might malfunction. By conventional way, one LED can only be used to indicate a single error, therefore, a large number of LEDs would be needed for a electronic device with a large number of components, which is not efficient and cost-saving.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, C, or Assembly. One or more software instructions in the modules may be embedded in firmware. It will be appreciated that modules may be comprised of connected logic units, such as gates and flip-flops, and may be comprised of programmable units, such as programmable gate arrays or processors. The modules described herein may be implemented as either software and/or hardware modules and may be stored in any type of computer-readable medium or other computer storage device.

Figure 1:
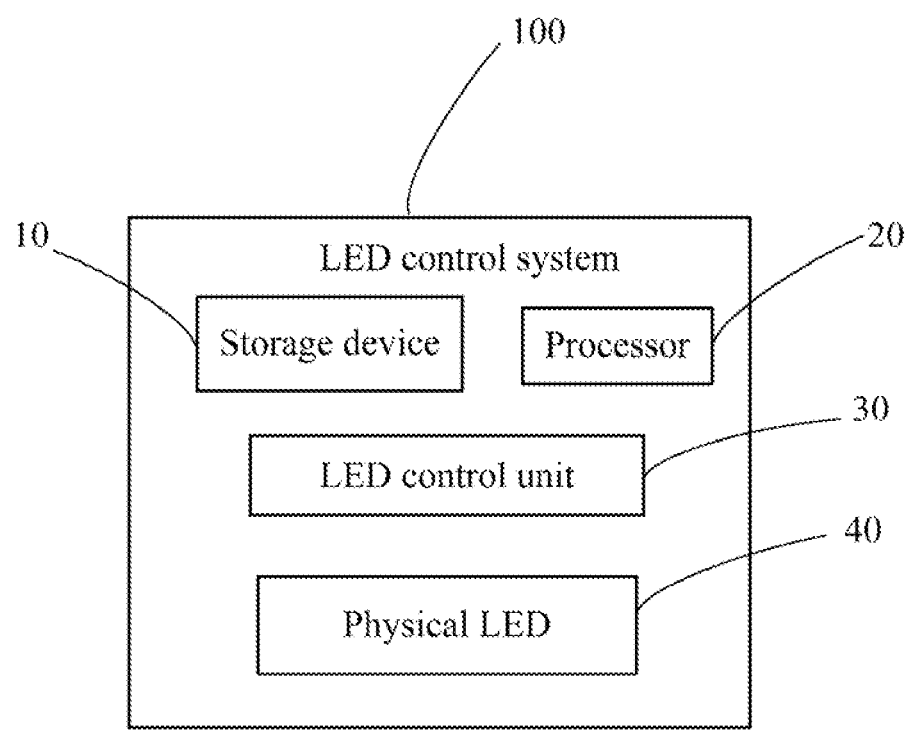
FIG. 1 is a block diagram of one embodiment of a light-emitting diode (LED) control system.

FIG. 1 is a block diagram of one embodiment of a light-emitting diode (LED) control system 100. Depending on the embodiment, the LED control system 100 may be a computer, a server, a notebook computer or any other computing device that uses one or more LEDs as work status indicators. In this embodiment, the LED control system 100 includes a storage device 10, a processor 20, a LED control unit 30, and a physical LED 40. The LED control unit 30 is used to assign different priority levels to error events to be indicated by the physical LED 40, assign an indication status of each error event, generate a plurality of virtual LEDs, and assign each virtual LED to indicate an error event of a priority level. If more than one error event exists at the same time, each error event will be indicated by a virtual LED by a corresponding indication status, and an indication status of an error event having the highest priority level will be synchronously displayed by the physical LED 40. It is understood that, a virtual LED may be represent by a graph, such as a circle or any other shape of figure, which can emit a predefined color of light just like the physical LED 40 and be displayed on a display of the LED control system 100.

Figure 2:
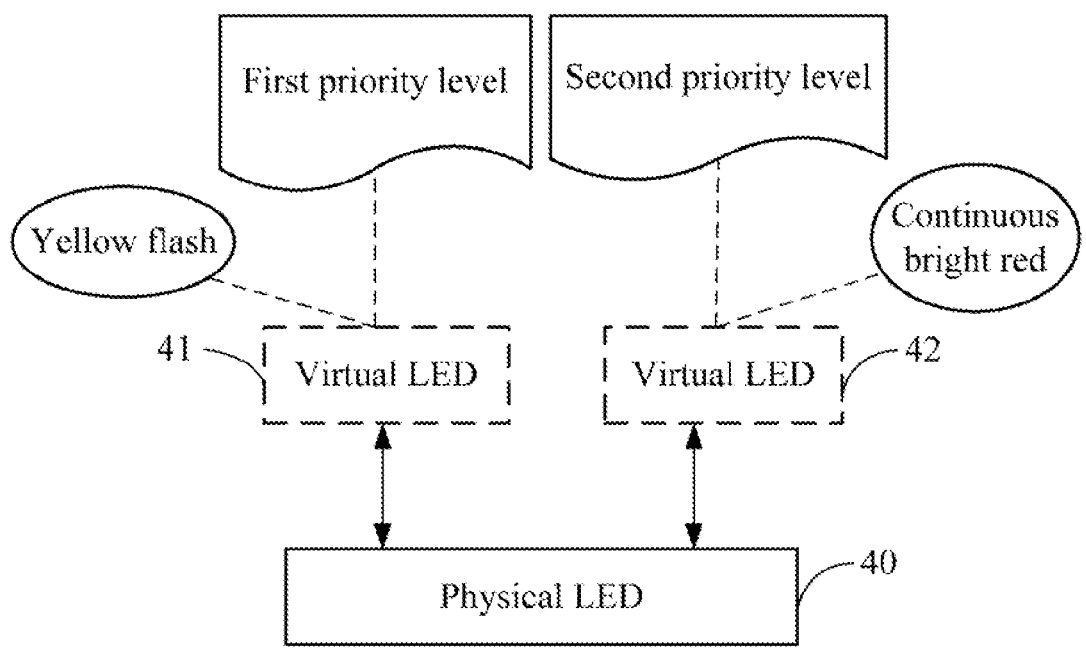
FIG. 2 gives an example for illustrating a work principle of the LED control system in FIG. 1.

FIG. 2 gives an example for illustrating a work principle of the LED control system 100 in FIG. 1. Supposing the physical LED 40 is responsible for indicating two error events, such as a first error event "unstable voltage" and a second error event "lower fan speed". The LED control unit 30 assigns a first priority level to the first error event, a second priority level to the second error event, where the second priority level is lower than the first priority level, and further assigns an indication status of the first error event is yellow flash, an indication status of the second error event is continuous bright red. In addition, the LED control unit 30 generates a first virtual LED 41 to be responsible for indicating the first error event, a second virtual LED 42 to be responsible for indicating the second error event. If the first error event and the second error event exists at the same time, the virtual LED 41 displays yellow flash, the virtual LED 42 displays continuous bright red. Since the first error event has a higher priority level, the physical LED 40 displays the indication status of the first virtual LED 41, that is, yellow flash. If the first error event quits, the virtual LED 41 is turned off by the LED control unit 30, while the second error event still exists, that is, the virtual LED 42 still displays continuous bright red, the physical LED 40 begins to display the indication status of the second virtual LED 42, that is, continuous bright red.

Figure 3:
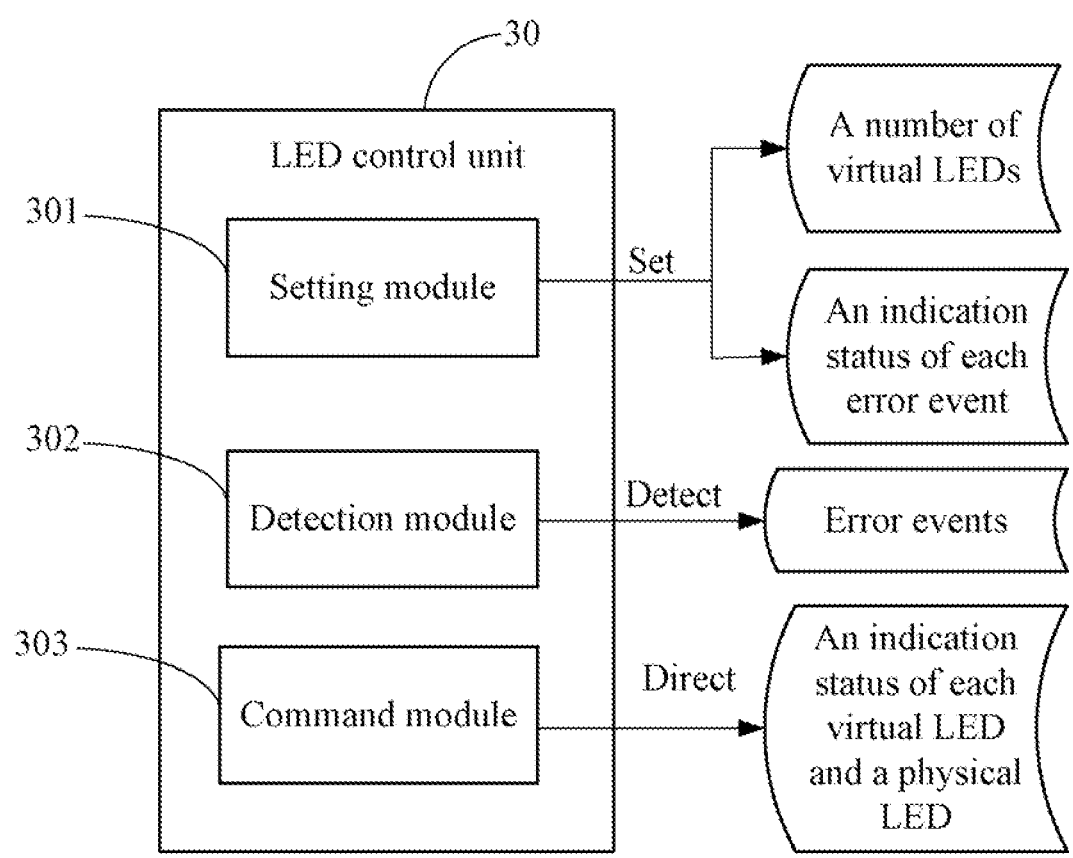
FIG. 3 is a block diagram of one embodiment of function modules of a LED control unit in FIG. 1.

FIG. 3 is a block diagram of one embodiment of function modules of the LED control unit 30 in FIG. 1. In one embodiment, the LED control unit 30 includes a setting module 301, a detection module 302, and a command module 303. One or more computerized codes of the modules 301 to 303 are stored in the storage device 10 of the LED control system 100, where the processor 20 of the LED control system 100 executes the one or more computerized codes, to provide one or more aforementioned operations of the LED control unit 30. Depending on the embodiment, the storage device 10 may be a smart media card, a secure digital card, or a compact flash card.

The setting module 301 sets a number of virtual LEDs according to a number of error events to be indicated by the physical LED 40. For example, if there are three error events, such as "unstable voltage," "lower fan speed," and "net card failure," then the setting module 301 sets three virtual LEDs for indicating each of the three error events.

The setting module 301 assigns a priority level for each error event and a unique indication status of the error event. For example, the setting module 301 assigns an indication status "yellow flash" and a first priority level to the error event "unstable voltage," assigns an indication status "continuous bright red" and a second priority level to the error event "lower fan speed," and assigns an indication status "continuous bright purple" and a third priority level to the error event "net card failure." In this embodiment, the priority levels are sequenced in a descending order, so the first priority level is the highest priority level.

The detection module 302 detects one or more error events according to preset conditions. For example, the detection module 302 may detect if the voltage of the LED control system 100 maintains an allowable voltage range, such as

[170 v, 240 v], to detect if the error event "unstable voltage" occurs to the LED control system 100.

If the detection module 302 detects one or more error events have occurred to the LED control system 100, the command module 303 controls a virtual LED to display a corresponding indication status of each error event. For example, if the error events "unstable voltage" and "lower fan speed" occur to the LED control system 100, the command module 303 controls a virtual LED 41 to display "yellow flash" and a virtual LED 42 to display "continuous bright red" (as shown in FIG. 2).

The command module 303 further directs the physical LED 40 to display an indication status of an error event having the highest priority level, if more than one error event exists at the same time. For example, as mentioned above, the error event "unstable voltage" has the highest priority level, so the command module 303 sends a first command to direct the physical LED 40 to display "yellow flash." While the error event having the highest priority level quits, if other error events remains, the command module 303 directs the physical LED 40 to display an indication status of an error event that has the highest priority level in the remain error events. For example, if while the error event "unstable voltage" quits, the error event "lower fan speed" remains, the command module 303 sends a second command to direct the physical LED 40 to display "continuous bright red."

While the physical LED 40 is displaying a current indication status of a current error event, if a new error event having a higher priority level occurs, the command module 303 changes the indication status of the physical LED 40 from the current indication status to an indication status of the new error event having the higher priority level. For example, while the physical LED 40 is displaying "continuous bright red" which indicating the error event "lower fan speed," if the error event "unstable voltage" occurs again, the command module 303 sends a third command to direct the physical LED 40 to change the indication status from "bright red" to "yellow flash."

It is understood that, though every time the physical LED 40 only displays one indication status for indicating one error event having the highest priority level in remain error events, the rest of the remain error events are indicated by corresponding indication status of the virtual LEDs.

Figure 4A:
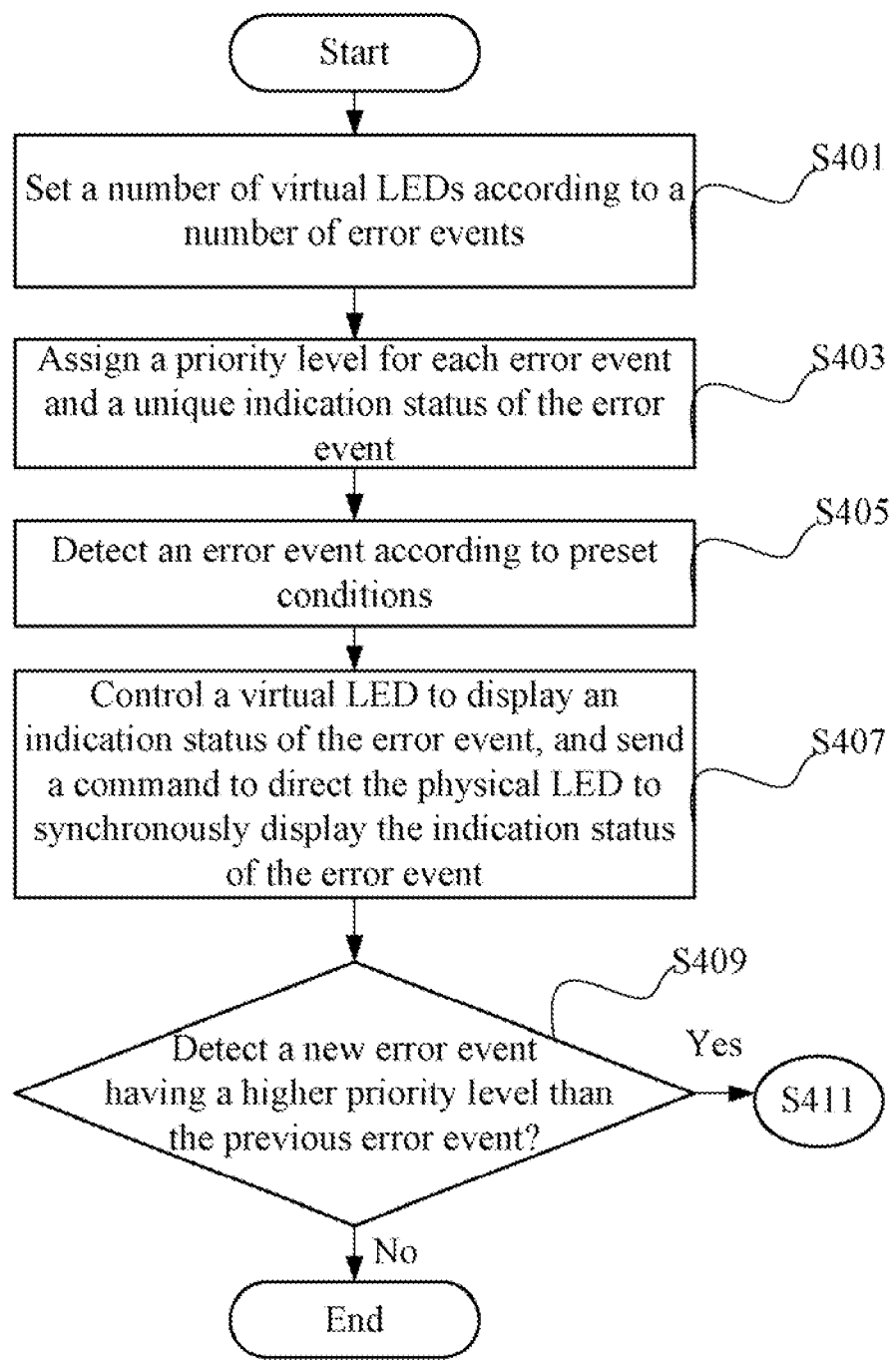
FIG. 4A and FIG. 4B are flowcharts of one embodiment of a LED control method.
Figure 4B:
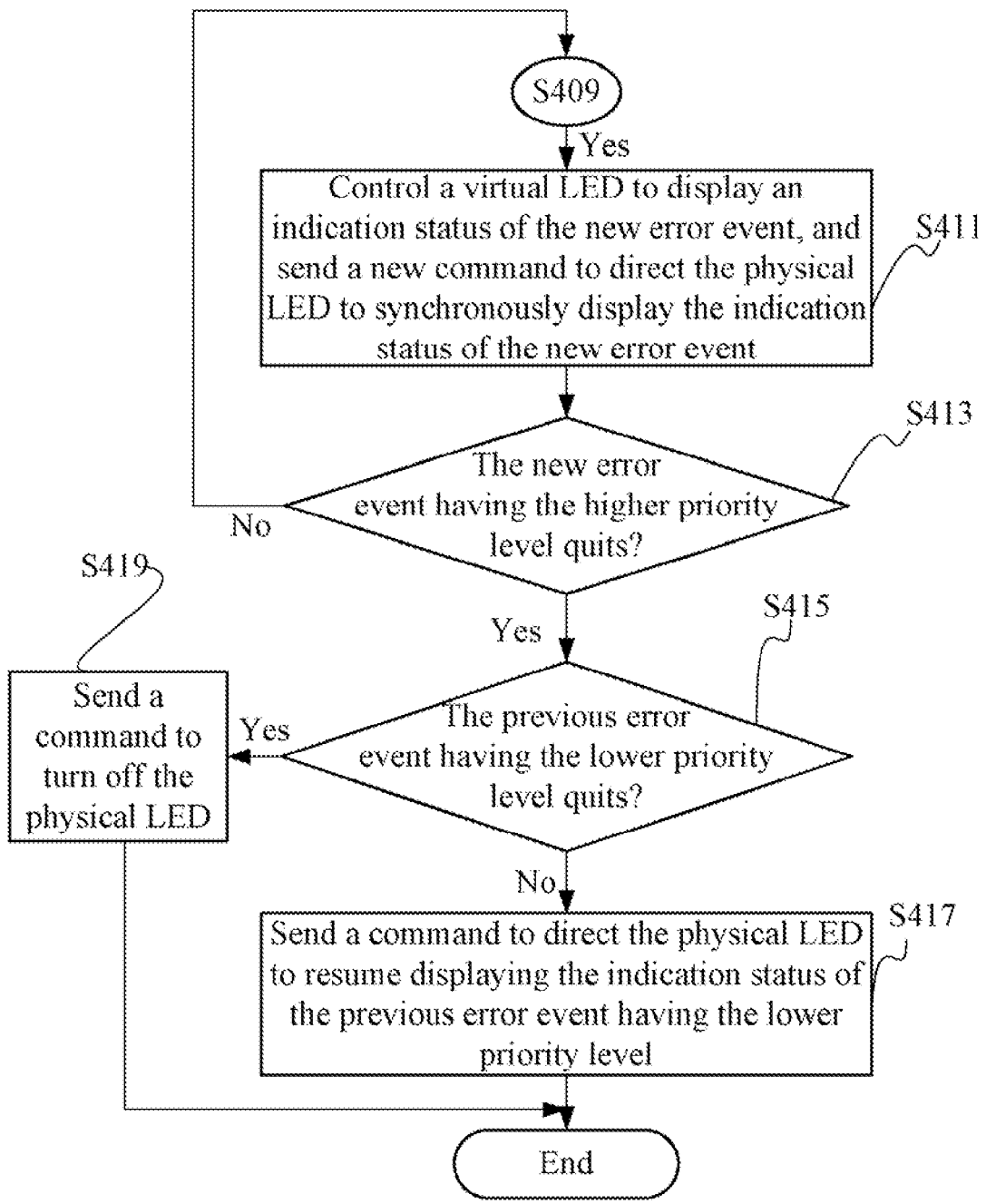

FIG. 4A and FIG. 4B are flowcharts of one embodiment of a LED control method. Depending on the embodiment, additional blocks may be added, others removed, and the ordering of the blocks may be changed.

In block S401, the setting module 301 sets a number of virtual LEDs according to a number of error events to be indicated by the physical LED 40. As mentioned above, for example, if there are three error events, such as "unstable voltage," "lower fan speed," and "net card failure," then the setting module 301 sets three virtual LEDs for indicating each of the three error events.

In block S403, the setting module 301 assigns a priority level to each error event and an indication status of the error event. For example, the error event "unstable voltage" is assigned an indication status "yellow flash" and a first priority level, the error event "lower fan speed" is assigned an indication status "continuous bright red" and a second priority level, and the error event "net card failure" is assigned an indication status "continuous bright purple" and a third priority level by the setting module 301. In this embodiment, the priority levels are sequenced in a descending order, so the first priority level is the highest priority level.

In block S405, the detection module 302 detects an error event according to preset conditions. For example, if a fan speed is lower than a preset speed range, such as [1800 r/min, 2200 r/min], the detection module 302 detects the error event "lower fan speed," where r/min means rotations per minute.

In block S407, the command module 303 controls a virtual LED to display a unique indication status of the error event. For example, the command module 303 controls a virtual LED to display "continuous bright red" for indicating the error event "lower fan speed." The command module 303 further sends a command to direct the physical LED 40 to display the indication status of the error event. For example, the command module 303 sends the command to direct the physical LED 40 to display "continuous bright red" for indicating the error event "lower fan speed."

In block S409, the detection module 302 detects if a new error event having a higher priority level than the previous error event occurs to the LED control system 100. If no new error event occurs, or a new error event occurs, but the new error event has a lower priority level than the previous error event, the command module 303 will not change the indication status of the physical LED, the procedure ends. It is understood that, if the new error event has the lower priority level than the previous error event occurs, the command module 303 will also assign a virtual LED to display an indication status of the new error event.

Otherwise, if in block S409, the detection module 302 detects a new error event having the higher priority level than the previous error event occurs, the procedure goes to block S411. For example, if the detection module 302 detects the new error event "unstable voltage" having the higher priority level than the previous error event "lower fan speed" occurs, the procedure goes to block S411.

In block S411, the command module 303 assigns a virtual LED to display an indication status of the new error event, and send a new command to direct the physical LED 40 to display the indication status of the new error event. For example, the command module 303 assigns a virtual LED to display "yellow flash" for indicating the new error event "unstable voltage," and sends the new command to direct the physical LED 40 to change indication status from "continuous bright red" to "yellow flash" for indicating the new error event "unstable voltage."

In block S413, the detection module 302 detects if the new error event having the higher priority level quits. If the new error event having the higher priority level remains, the procedure returns to block S409. Otherwise, if the new error event having the higher priority level quits, the procedure goes to block S415. For example, the detection module 302 detects if the new error event "unstable voltage" quits, the procedure goes to block S415.

In block S415, the detection module 302 detects if the previous error event having the lower priority level quits. If the previous error event having the lower priority level also quits, for example, if the previous error event "lower fan speed" also quits, the procedure goes to block S419, the command module 303 sends a command to turn off the physical LED 40, then the procedure ends. If the previous error event having the lower priority level remains, for example, if the previous error event "lower fan speed" remains, the procedure goes to block S417.

In block S417, the command module 303 sends a command to direct the physical LED 40 to resume displaying the indication status of the previous error event having the lower priority level. For example, while the new error event "unstable voltage" quits, if the previous error event "lower fan speed" remains, the command module 303 sends a command to direct the physical LED 40 to resume displaying the indication status "continuous bright red." Then, the procedure ends.

The above embodiments uses a plurality of virtual LEDs to indicate and record all current existing error events, and uses only one physical LED 40 to synchronously indicate the error event having the highest priority level to alarm users. All error events can be indicated but no indication conflict occurs to the only one physical LED 40. The users can watch the indication status of the physical LED to know most urgent error occurring to the LED control system 100, and checks the virtual LEDs to know all error events occurring to the LED control system 100.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A light-emitting diode (LED) control system, comprising:
    a physical LED;
    a storage device;
    at least one processor; and
    one or more computerized codes stored in the storage device and executable by the at least one processor, the one or more computerized codes comprising:
    a setting module operable to set a number of virtual LEDs to indicate a number of error events, assign a priority level to each error event and a unique indication status of the error event, wherein each virtual LED is represented by a graph that is displayed on a display device of the LED control system;
    a detection module operable to detect one or more error events occurring to the LED control system according to preset conditions; and
    a command module operable to control a virtual LED to display a corresponding indication status of each error event, direct the physical LED to synchronously display an indication status of an error event having the highest priority level, if more than one error event exists at the same time;
    wherein, when the error event having the highest priority level quits, if other error events remain, the command module is further operable to direct the physical LED to synchronously display an indication status of an error event that has the highest priority level in the remain error events; and
    when the physical LED is displaying a current indication status of a current error event, if a new error event having a higher priority level occurs, the command module is further operable to change the indication status of the physical LED from the current indication status to an indication status of the new error event having the higher priority level.

2. The system as claimed in claim 1, wherein the command module is further operable to turn off a virtual LED if a corresponding error event indicated by the virtual LED quits, and operable to turn off the physical LED if all error events quit.

3. The system as claimed in claim 1, wherein the indication status is a flash color or a continuous color.

4. The system as claimed in claim 1, wherein the storage device is selected from the group consisting of a smart media card, a secure digital card, and a compact flash card.

5. The system as claimed in claim 1, wherein the system is a computer or a server.

6. A light-emitting diode (LED) control method, comprising:
    (a) setting a number of virtual LEDs to indicate a number of error events of a computing device, wherein each virtual LED is represented by a graph that is displayed on a display device of the LED control system;
    (b) assigning a priority level to each error event and a unique indication status of the error event;
    (c) detecting an error event occurring to the computing device according to preset conditions;
    (d) controlling a virtual LED to display an indication status of the error event, and sending a command to direct the physical LED to synchronously display the indication status of the error event;
    (e) detecting if a new error event having a higher priority level than the previous error event occurs to the computing device, if no new error event occurs, or a new error event occurs but the new error event has a lower priority level than the previous error event, controlling a virtual LED to display an indication status of the new error event and ending the procedure, if a new error event having a higher priority level than the previous error event occurs to the computing device, going to step (f);
    (f) controlling a virtual LED to display an indication status of the new error event, and sending a new command to direct the physical LED to synchronously display the indication status of the new error event;
    (g) detecting if the new error event having the higher priority level quits, if the new error event having the higher priority level remains, returning to step (e), if the new error event having the higher priority level quits, going to step (h);
    (h) detecting if the previous error event having the lower priority level quits, if the previous error event having the lower priority level quits, going to step (i), if the previous error event having the lower priority level remains, going to step (j);
    (i) sending a command to turn off the physical LED, then ending the procedure; and
    (j) sending a command to direct the physical LED to resume displaying the indication status of the previous error event having the lower priority level, then ending the procedure.

7. The method as claimed in claim 6, further comprising:
    storing the priority level of each error event and the indication status of the error event into a storage device of the computing device.

8. The method as claimed in claim 7, wherein the storage device is selected from the group consisting of a smart media card, a secure digital card, and a compact flash card.

9. The method as claimed in claim 6, further comprising:
    sending a command to turn off the virtual LED for displaying the indication status of the new error event, if the new error event quits in step (g).

10. The method as claimed in claim 6, further comprising:
    sending a command to turn off the virtual LED for displaying the indication status of the previous error event, if the previous error event quits in step (h).

11. The method as claimed in claim 6, wherein the computing device is a computer or a server.

12. The method as claimed in claim 6, wherein the indication status is a flash color or a continuous color.

13. A non-transitory computer readable medium storing a set of instructions, the set of instructions capable of being executed by a processor to perform a light-emitting diode (LED) control method, the method comprising:

(a) setting a number of virtual LEDs according to a number of error events of a computing device, wherein each virtual LED is represented by a graph that is displayed on a display device of the LED control system;

(b) assigning a priority level to each error event and a unique indication status of the error event;

(c) detecting an error event occurring to the computing device according to preset conditions;

(d) controlling a virtual LED to display an indication status of the error event, and sending a command to direct the physical LED to synchronously display the indication status of the error event;

(e) detecting if a new error event having a higher priority level than the previous error event occurs to the computing device, if no new error event occurs, or a new error event occurs but the new error event has a lower priority level than the previous error event, controlling a virtual LED to display an indication status of the new error event and ending the procedure, if a new error event having a higher priority level than the previous error event occurs to the computing device, going to step (f);

(f) controlling a virtual LED to synchronously display an indication status of the new error event, and sending a new command to direct the physical LED to display the indication status of the new error event;

(g) detecting if the new error event having the higher priority level quits, if the new error event having the higher priority level remains, returning to step (e), if the new error event having the higher priority level quits, going to step (h);

(h) detecting if the previous error event having the lower priority level quits, if the previous error event having the lower priority level quits, going to step (i), if the previous error event having the lower priority level remains, going to step (j);

(i) sending a command to turn off the physical LED, then ending the procedure; and (j) sending a command to direct the physical LED to resume displaying the indication status of the previous error event having the lower priority level, then ending the procedure.

14. The non-transitory computer readable medium as claimed in claim 13, wherein the method further comprises:
storing the priority level of each error event and the indication status of the error event into the non-transitory computer readable medium of the computing device.

15. The non-transitory computer readable medium as claimed in claim 13, wherein the method further comprises:
sending a command to turn off the virtual LED for displaying the indication status of the new error event, if the new error event quits in step (g).

16. The non-transitory computer readable medium as claimed in claim 13, wherein the method further comprises:
sending a command to turn off the virtual LED for displaying the indication status of the previous error, if the previous error event quits in step (h).

17. The non-transitory computer readable medium as claimed in claim 13, wherein the non-transitory computer readable medium is selected from the group consisting of a smart media card, a secure digital card, and a compact flash card.

18. The non-transitory computer readable medium as claimed in claim 13, wherein the computing device is a computer or a server.

19. The non-transitory computer readable medium as claimed in claim 13, wherein the indication status is a flash color or a continuous color.

* * * * *